US011481568B1

(12) United States Patent
Lozano et al.

(10) Patent No.: US 11,481,568 B1
(45) Date of Patent: Oct. 25, 2022

(54) DOME ILLUMINATOR FOR VISION SYSTEM CAMERA AND METHOD FOR USING THE SAME

(71) Applicant: Cognex Corporation, Natick, MA (US)

(72) Inventors: Esther Oteo Lozano, Aachen (DE); Jose Fernandez Dorado, Aachen (DE); Nicole Dippel, Aachen (DE); Pablo Garcia Campos, Aachen (DE); Laurens Nunnink, Simpleveld (NL)

(73) Assignee: Cognex Corporation, Natick, MA (US)

( * ) Notice: Subject to any disclaimer, the term of this patent is extended or adjusted under 35 U.S.C. 154(b) by 13 days.

(21) Appl. No.: 17/081,980

(22) Filed: Oct. 27, 2020

Related U.S. Application Data

(63) Continuation-in-part of application No. 16/583,639, filed on Apr. 20, 2020, now abandoned, which is a continuation of application No. 15/859,298, filed on Dec. 29, 2017, now Pat. No. 10,628,646.

(51) Int. Cl.
*G06K 7/14* (2006.01)
*H04N 5/225* (2006.01)
*G06K 7/10* (2006.01)

(52) U.S. Cl.
CPC ....... *G06K 7/1417* (2013.01); *G06K 7/10881* (2013.01); *H04N 5/2252* (2013.01); *H04N 5/2256* (2013.01); *H04N 5/2258* (2013.01)

(58) Field of Classification Search
CPC ............. G06K 7/1417; G06K 7/10881; H04N 5/2252; H04N 5/2256; H04N 5/2258
See application file for complete search history.

(56) References Cited

U.S. PATENT DOCUMENTS

| 4,960,314 A | 10/1990 | Smith |
| 5,015,069 A | 5/1991 | Bryan |
| 5,016,950 A | 5/1991 | Smith |
| 5,064,286 A | 11/1991 | Ai |

(Continued)

OTHER PUBLICATIONS

"Automated Surface Defect Inspection for Vehicle Production," https://metrology.news/automated-vehicle-surface-defect-inspection/, Published Nov. 10, 2016.

(Continued)

*Primary Examiner* — Seung H Lee
(74) *Attorney, Agent, or Firm* — Loginov & Associates, PLLC; William A. Loginov

(57) ABSTRACT

This invention provides an illumination assembly that is typically attached to the front end of a vision system camera assembly, adapted to generate an illumination pattern onto an object, which allows the vision system process(or) to perform basic shape inspection of the object in addition to feature detection and decoding. A dome illuminator with a diffuse inner surface is provided to the camera assembly with a sufficient opening side to surround the object. The dome illuminator has two systems to create the pattern on an object, including a diffuse illuminator for specular/shiny object surfaces and a secondary, projecting illuminator for matte/diffusive object surfaces. The diffuse illuminator includes a set of light-filtering structures on its inner surface—for example concentric strips or rings that allow projection of a ringed fringe pattern on an (e.g. shiny/specular) object. The fringes can additionally be generated in a given a certain wavelength and/or visible color.

19 Claims, 13 Drawing Sheets

(56) References Cited

U.S. PATENT DOCUMENTS

| | | | |
|---|---|---|---|
| 5,461,417 A * | 10/1995 | White | H04N 1/0289 348/131 |
| 5,783,752 A | 7/1998 | Thorburn | |
| 6,724,535 B1 | 4/2004 | Clabburn | |
| 6,884,993 B2 | 4/2005 | Ahten | |
| 7,281,662 B2 | 10/2007 | He | |
| 7,857,224 B2 | 12/2010 | Lei | |
| 7,877,003 B2 | 1/2011 | Dunn | |
| 7,886,979 B2 | 2/2011 | Lei | |
| 7,978,970 B2 | 7/2011 | Pastore | |
| 8,011,583 B2 | 9/2011 | Lei | |
| 8,028,913 B2 | 10/2011 | Liu | |
| 8,032,017 B2 | 10/2011 | Pastore | |
| 8,224,174 B2 | 7/2012 | Pastore | |
| 8,540,383 B2 | 9/2013 | Pohlert | |
| 8,674,616 B2 | 3/2014 | Holman | |
| 8,730,212 B2 | 5/2014 | Powell | |
| 8,761,565 B1 | 6/2014 | Coleman | |
| 8,878,924 B2 | 11/2014 | Farr | |
| 9,159,942 B2 | 10/2015 | Seo | |
| 9,179,840 B2 | 11/2015 | Su | |
| 9,569,653 B1 | 2/2017 | Suman | |
| 10,007,118 B2 | 6/2018 | Border | |
| 10,217,235 B2 | 2/2019 | Ludwig | |
| 10,408,390 B2 | 9/2019 | Minor | |
| 10,775,022 B2 | 9/2020 | Di Trapani | |
| 2004/0159703 A1 | 8/2004 | Kogan | |
| 2004/0173681 A1 | 9/2004 | Toyama | |
| 2008/0137325 A1 | 6/2008 | Pastore | |
| 2012/0092131 A1 | 4/2012 | Vasic | |
| 2014/0261627 A1 | 9/2014 | Meitl | |
| 2014/0376003 A1 | 12/2014 | Keränen | |
| 2018/0160903 A1 | 6/2018 | Su | |
| 2019/0188432 A1 | 6/2019 | Lozano | |

OTHER PUBLICATIONS

"EinScan Best Practices: For Objects Difficult to Scan," https://www.einscan.com/news/einscan-best-practices-for-objects-difficult-to-scan/, published May 27, 2019.

"Full-field 3D shape measurement of discontinuous specular objects by direct phase measuring deflectometry," Liu et al. Published Aug. 31, 2017.

* cited by examiner

DOME ILLUMINATOR FOR VISION SYSTEM CAMERA AND METHOD FOR USING THE SAME

RELATED APPLICATION

This application is a continuation-in-part of co-pending U.S. patent application Ser. No. 16/853,639, entitled OFF-AXIS DUAL-SENSOR VISION SYSTEM CAMERA AND METHOD FOR USING THE SAME, filed Apr. 20, 2020, which is a continuation of co-pending U.S. patent application Ser. No. 15/859,298, entitled OFF-AXIS DUAL-SENSOR VISION SYSTEM CAMERA AND METHOD FOR USING THE SAME, filed Dec. 29, 2017, now U.S. Pat. No. 10,628,646, issued Apr. 21, 2020, the teachings of each of which applications are expressly incorporated herein by reference.

FIELD OF THE INVENTION

This invention relates to machine vision systems for use in finding and decoding ID codes on objects, and more particularly to cameras for such vision systems

BACKGROUND OF THE INVENTION

Vision systems that perform measurement, inspection, alignment of objects and/or decoding of symbology in the form of machine-readable symbols (also termed "IDs", such as a 2D matrix symbol) are used in a wide range of applications and industries. These systems are based around the use of an image sensor, which acquires images (typically grayscale or color, and in one, two or three dimensions) of the subject or object, and processes these acquired images using an on-board or interconnected vision system processor. The processor generally includes both processing hardware and non-transitory computer-readable program instructions that perform one or more vision system processes to generate a desired output based upon the image's processed information. This image information is typically provided within an array of image pixels each having various colors and/or intensities. In the example of an ID reader (also termed herein, a "camera"), the user or automated process acquires an image of an object that is believed to contain one or more barcodes. The image is processed to identify barcode features, which are then decoded by a decoding process and/or processor obtain the inherent alphanumeric data represented by the code.

In operation, an ID reader typically functions to illuminate the scene containing one or more IDs. The illuminated scene is then acquired by an image sensor within the imaging system through optics. The array sensor pixels are exposed, and the electronic value(s) generated for each pixel by the exposure is/are stored in an array of memory cells that can be termed the "image" of the scene. In the context of an ID-reading application, the scene includes an object of interest that has one or more IDs of appropriate dimensions and type. The ID(s) are part of the stored image.

While many applications for ID readers can employ a fixed mount arrangement, with objects moving through an imaged scene, a common type of ID reader is a handheld arrangement, with or without a "pistol grip" handle. Such readers are used by workers to read IDs on (typically) stationary objects (parts) in a warehouse or other repository. Such readers can also be used to identify ID-coded parts in an assembly (e.g. an automobile on a production line), or for any other application that benefits from identifying and/or tracking components/parts. In general, working distances, illumination and other parameters for such readers can vary as a user moves from part-to-part and it is desirable that a reader have the capability to handle such variations.

More particularly, to better image ID codes, particularly those on shiny (i.e. reflective or substantially specular) rounded surfaces (e.g. Direct Part Marking, or "DPM" codes), special lighting is desirable. Several approaches have been provided to assist in reading such codes—for example, diffusive lighting, low-angle light, polarized light and/or structured light. This specialized lighting can be used in conjunction with another, conventional illuminator. However, none of these approaches has fully addressed two significant challenges in reading (e.g.) DPM codes on round/curvilinear surfaces, namely (a) eliminating the reflection of the reader's camera in the background (a.k.a. the black hole or stripe) when reading DPM codes on shiny, rounded surfaces, and (b) enabling image capture with a plurality of discrete/differing illumination sources simultaneously, so as to improve the overall acquisition (trigger-to-beep) time.

It is further desirable to provide added data, such as dimensions when imaging an object to read ID codes. This can be challenging based upon the surface shape and type—for example matte versus shiny or specular surfaces.

SUMMARY OF THE INVENTION

This invention overcomes disadvantages of the prior art by providing, an illumination assembly that is typically attached to the front end of a vision system camera assembly, adapted to generate an illumination pattern onto an object, which allows the vision system process(or) to perform basic shape inspection of the object in addition to feature detection and decoding—for example ID decoding. A dome illuminator with a diffuse inner surface is provided to the camera assembly with a sufficient opening side to surround the object. The dome illuminator has two systems to create the pattern on an object, including a diffuse illuminator for substantially specular/shiny object surfaces and a secondary, projecting illuminator for matte/diffusive object surfaces. The diffuse illuminator includes a set of light-filtering structures on its inner surface—for example concentric strips or rings that allow projection of a ringed fringe pattern on an (e.g. shiny/specular) object. As such a single vision system camera arrangement can be employed to acquire images of any object relatively independent of its surface properties. From the image of the object with the pattern on it, the shape of the object can be inspected/determined (measured or compared to a trained reference). The dome illuminator can be tilted to a predetermined angle relative to vertical (for example approximately 15 degrees) to avoid the reflection of the camera optics aperture, and allow for identification and resolving of ID code features on shiny/specular object surfaces. The fringes can additionally be generated in a given a certain wavelength and/or visible color, for example red, so that when using red light the appearance is of a uniform diffuse light dome, useful for reading codes, and when using green light, the fringes appear dark, and hence a shiny/specular object shape can be inspected.

In an illustrative embodiment, an illumination system, for a vision system camera, which provides image data to a vision system processor, and defines a first optical axis and a field of view (FOV) surrounding the first optical axis is provided. The illumination system can comprise a dome illuminator having a predetermined length and that substantially envelopes the FOV. The dome illuminator can define an inside emitter surface that is substantially diffuse along at least a portion thereof. The dome illuminator can also approximately define a central axis that is non-parallel with respect to the first optical axis. As such, the dome illuminator can generate a substantially uniform light distribution on an object in the FOV. A pattern of light-filtering elements can selectively filter light emitted from the inside emitter surface, located along the central axis. The vision system camera can be arranged to capture an image in the FOV of the pattern of light filtering elements reflected by the object where a surface thereof is shiny. The vision system processor can be arranged to determine a shape of the surface of the object based upon the image. Illustratively, the pattern of light-filtering elements can define a plurality of stripes that reside at spaced-apart locations in a direction along the central axis of the inside emitter surface. The pattern of light-filtering elements can be arranged to define a plurality of approximately concentric rings about the central axis within the FOV. The vision system processor can analyze a geometric arrangement of the concentric rings in the image of the object to determine a relative shape of the object. The image can include ID code features and the vision system processor can be arranged to find and decode ID codes in the image. Illustratively, a structured light accessory can project structured light so as to define a structured light pattern on an object and the vision system processor can be arranged to determine a surface shape of the object based upon the structured light pattern. The vision system processor can be arranged to analyze an object having a non-specular or matte surface based upon an arrangement of the structured light pattern on the non-specular or matte surface and to analyze the object having the shiny surface based upon a diffuse light emitted from the emitter surface. Light sources can be provided in optical communication with the dome illuminator, and can be adapted to project a plurality of discrete visible wavelength ranges through the inside emitter surface. The light-filtering elements can be adapted to transmit at least one of the plurality of discrete visible wavelength ranges projected by the light sources and to filter out another of the plurality of discrete visible wavelength ranges projected by the light sources. At least one of the plurality of discrete visible wavelength ranges can be projected by the light sources and the other of the plurality of discrete visible wavelength ranges projected by the light sources are complementary colors with respect to each other. The vision system camera can further comprise a first imaging system having a first image sensor and first optics defining a first optical axis with respect to the FOV. The first imaging system can be contained in a housing defining a device optical axis. The device optical axis can be defined with respect to an aimer beam or a mechanical geometric reference on the housing. A vision system housing can be provided for the system, and adapted for handheld use. The housing can have (a) an aimer illumination source and/or (b) a mechanical geometric reference that assists a user in orienting the housing with respect to features of interest on an object. The vison system camera can further comprise a second imaging system having a second image sensor and a second optics having a second optical axis. The second optical axis can be oriented on-axis with the device optical axis adjacent to the FOV. The second optical axis can be brought together, on-axis, with the device optical axis by an optical component that bends light from a first path to a second path. Also, the first optics or the second optics can include an adjustable-focus variable lens, such as a liquid lens.

In another illustrative embodiment, a vision system for imaging an object can be provided. The vision system can have a first imaging system having a first image sensor and first optics defining a first optical axis with respect to the object and a vision system processor that receives image data from the first imaging system. A dome illuminator can be provided, having a predetermined length, arranged so as to substantially envelope the FOV. The dome illuminator can define an inside emitter surface that is substantially diffuse along at least a portion thereof and approximately defining a central axis that is non-parallel with respect to the first optical axis. As such, the dome illuminator generates a substantially uniform light distribution on an object in the FOV. A pattern of light-filtering elements can selectively filter light emitted from the inside emitter surface, located along the central axis. The vision system camera can be arranged to capture an image in the FOV of the pattern of light filtering elements reflected by the object where a surface thereof is shiny. The vision system processor can be arranged to determine a shape of the surface of the object based upon the image. Illustratively, a structured light accessory can project structured light so as to define a structured light pattern on an object, and the vision system processor can be arranged to determine a surface shape of the object based upon the structured light pattern. The vison system can comprise a second imaging system having a second image sensor and a second optics having a second optical axis, the second optical axis can be on-axis with a device optical axis adjacent to the object.

BRIEF DESCRIPTION OF THE DRAWINGS

The invention description below refers to the accompanying drawings, of which.

DETAILED DESCRIPTION

I. Multi-Axis Vision System Camera

Figure 1:
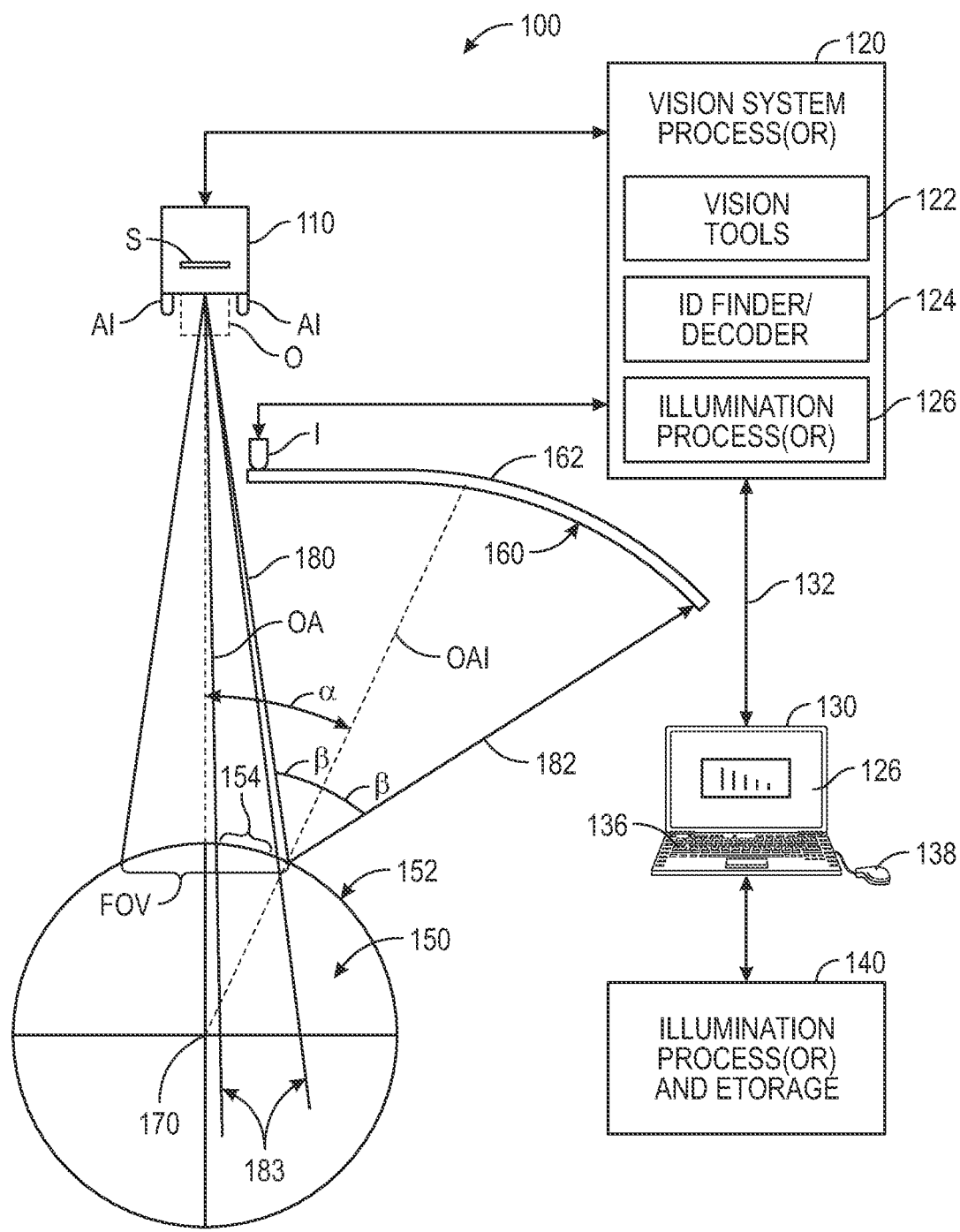
FIG. 1 is a diagram of a generalized vision system for reading and decoding features (e.g. Direct Part Marking (DPM) codes) located on shiny/reflective (substantially specular) rounded surfaces, including a diffusive illuminator arranged in an off-axis configuration, according to an illustrative embodiment.

FIG. 1 shows a vision system arrangement 100 that is adapted to capture images and decode features with respect to a shiny (i.e. reflective or substantially specular) rounded surface according to an exemplary embodiment. The system 100 includes a vision system camera assembly 110 with a (e.g. two-dimensional (2D)) sensor S and associated lens optics O. The vision system camera assembly 110 transmits captured images to a vision system process(or) 120 that can be instantiated within the camera assembly entirely, or partially/fully located remote from the camera assembly—for example in a general-purpose computing device 130, such as a PC, server, laptop, tablet or handheld device (e.g. smartphone). Such device can also be intermittently connected via an appropriate (e.g. wired or wireless) network link 132 for setup and/or runtime control and data acquisition. Such a device 130 can also include and appropriate user interface, including a display and/or touchscreen 134, keyboard 136 and mouse 138. Acquired data (e.g. decoded IDs) is transferred from the processor 120 and/or the device 130 to a utilization device or process(or) 140, which can include tracking and/or logistics software or other data-handling/storage applications.

The vision system process(or) 120 can include various functional processor and associated processes or modules. By way of non-limiting example, such processes/modules can include a plurality of vision tools 122, including edge-finders, blob analyzers, calipers, pattern recognition tools, etc. Vision system tools are commercially available from a variety of vendors, such as Cognex Corporation, of Natick, Mass. The process(or) 120 can also include an ID (or other feature) finder and decoder 124, that uses information retrieved by the vision tools from acquired images to locate ID candidates (e.g. DPM codes) and decode successfully identified candidates to extract alphanumeric (and other) information. The processor can also include various camera control processor and associated processes/modules, including a trigger and an illumination process(or) 126. This is used to control image acquisition and operation of the illumination system that projects appropriate light onto the surface of an imaged object 150.

The depicted object 150 defines a rounded or round (e.g. cylindrical) surface 152, such as a motor shaft or gear stem. By way of example, the surface can be metallic, and moderately or highly smooth, which renders it relatively shiny/reflective. This reflectivity can be challenging when attempting to acquire a useable image of a future set (e.g. a DPM code) 154 formed on the surface 152. As shown, the exemplary features 154 reside within the field of view FOV of the camera assembly 110, which is defined around an optical axis OA. The FOV is highly variable depending upon the type of optics employed and the focal distance. Note that the optics O in this exemplary depiction is arranged in a straight-line configuration. In this depiction the axis OA perpendicular to the image plane of the sensor S and the image of the camera may generally appear in the background of the acquired image, which is often undesirable. A useable/decodable image of the ID code 154 (with a diffuse background) can be acquired in this configuration when the code is off-axis. In this case, the center 170 of the cylindrical object 150 should be located outside that portion of the field of view (within boundaries 183) where the code 154 is located.

However, in operative embodiments, it is contemplated that optics can be arranged at a non-perpendicular angle with respect to the sensor—for example, defining a Scheimpflug configuration, which can allow for extension of the overall depth of field (DOF) and/or avoid a returned reflection from the camera. Such an arrangement is shown and described in commonly assigned U.S. patent application Ser. No. 15/844,448, entitled DUAL-IMAGING VISION SYSTEM CAMERA AND METHOD FOR USING THE SAME, filed Dec. 15, 2017, the teachings of which are incorporated herein by reference as useful background information.

Figure 1A:
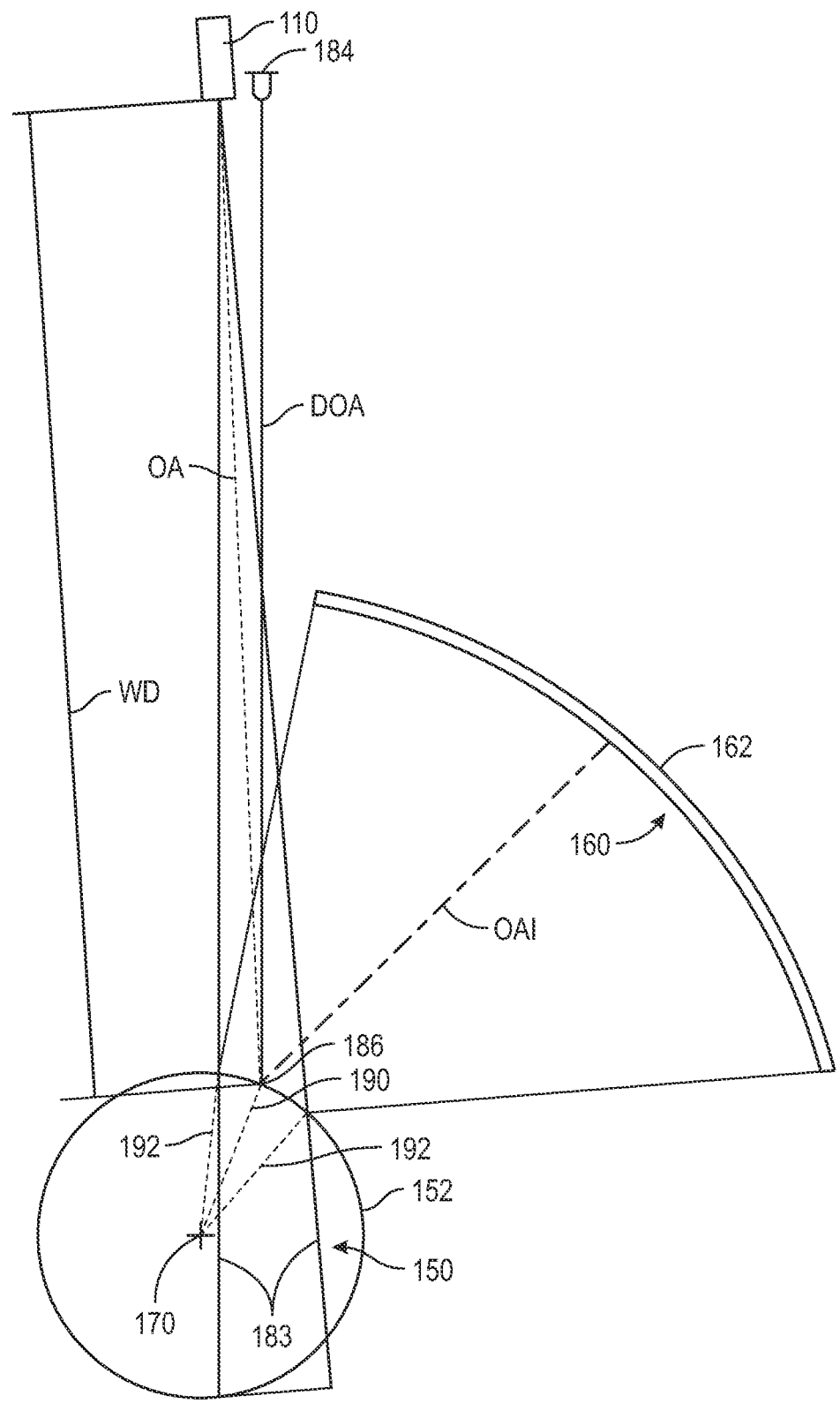
FIG. 1A is a diagram of various axes and distances in association with the vision system configuration of FIG. 1.

Notably, system 100 includes a diffusive illuminator 160, which is adapted particularly to illuminate rounded/curvilinear surfaces, such as the object surface 152. The position and size of the illuminator 160 are each accentuated in the depiction of FIG. 1 for the purposes of illustration and clarity. In various embodiments, the diffusive illuminator can be integrated with the front end of the camera assembly. The diffusive illumination is projected into the field of view (FOV) by the illuminator so that it strikes the surface 152 at a range of angles. This creates a lighting effect that accentuates the DPM code around the curved surface. Such diffusive illumination can be generated by different types of techniques. The diffuser element 162 can be a standard opal diffuser with LED sources (shown as light source I) that create a uniform luminance surface. The diffusive illuminator can also be a backlighted/side-lighted film, or an electroluminescent foil. The geometry of the diffusive illuminator 160 can be defined as the inside surface of a dome or semi-cylinder (as shown). The depicted dome/semi-cylinder configuration thereby projects a light that is desirable for illuminating shiny cylindrical objects and surfaces. Reference is also made to the simplified diagram of FIG. 1A, which includes a laser aimer 184, placed aside the camera 110 and associated aimer beam DOA, which also serves as the "device optical axis". In the above-described configuration, the working distance WD from the camera assembly 110 to the object surface 150 is typically defined by the crossing of the camera optical axis OA and the illumination diffuser's axis OAI at the point 186. Note that the diffuser's axis OAI can be a relative axis of symmetry or center of curvature for the concave or domed surface of the diffuser element, and is shown centered (equal angles $\beta$) between the adjacent boundary edge (ray 180) of the camera FOV and the outermost boundary edge (ray 182) of the diffusive illuminator 160, and is more generally tilted at a non-perpendicular and non-zero (e.g. acute) angle α. More generally, the device optical axis DOA can be defined by the aimer beam (as shown), or by mechanical features on the vision system housing. Thus, in operating the handheld implementation of the system and method herein, the user directs the aimer beam onto (or in the general region of) the ID code of interest, with the surface of the object approximately perpendicular to the aimer beam (and/or perpendicular to a tangent line/plane of the surface at the point of the code). Note that the mechanical features on the vision system housing that define the Device Optical Axis can include (for example) (a) visible lines on the outside of the housing, (b) the parting line between the parts of the enclosure (where the housing enclosure is formed in halves that are fastened or adhered together during assembly), and/or (c) a flat surface or window on the front side of the housing (i.e. on its code-reading end), recognizing that users can (usually) successfully position a device with a flat front surface or window parallel to the object surface. In such case the direction perpendicular to the front surface of the housing can be considered as the device optical axis. The device optical axis is defined as the preferred reading direction and location, in other words, the reading performance is optimized if the code is on or near the device optical axis and the surface of the object is perpendicular to the device optical axis.

As also depicted in FIG. 1, the location of the feature of interest (e.g. an ID code 154 (FIG. 1)) on the object 150 is at the point 186 where axes OA, OAI and DOA intersect. The relationship of this point 186 to the partial field of view 183, the surface 152 of the object 150 and the object center 170 is also defined by depicted dashed lines 190 and 192.

Note that the arrangement of the diffuser's optical axis OAI versus camera optical axis OA is termed "off-axis" in that the illumination is aligned at a non-zero angle with respect to the camera optical axis. This varies from an on-axis illumination arrangement, in which illumination is directed at a zero angle (i.e. aligned with) the camera optical axis. Note further that the camera assembly 110 can include a conventional (e.g. on-axis) illumination system that directs illumination in a straight line toward the object along the optical axis OA—for example, a set of high-powered LEDs AI arranged around the perimeter of the optics O. An appropriate cover, diffuser and/or filter can be provided over the LEDs—also described below. The LEDs AI can be part of a low-angle-light illumination system that supplements the diffusive illumination. Alternatively, a separate low-angle system can be located on a mounting that is either attached to, or remote from, the system device housing.

Figure 2:
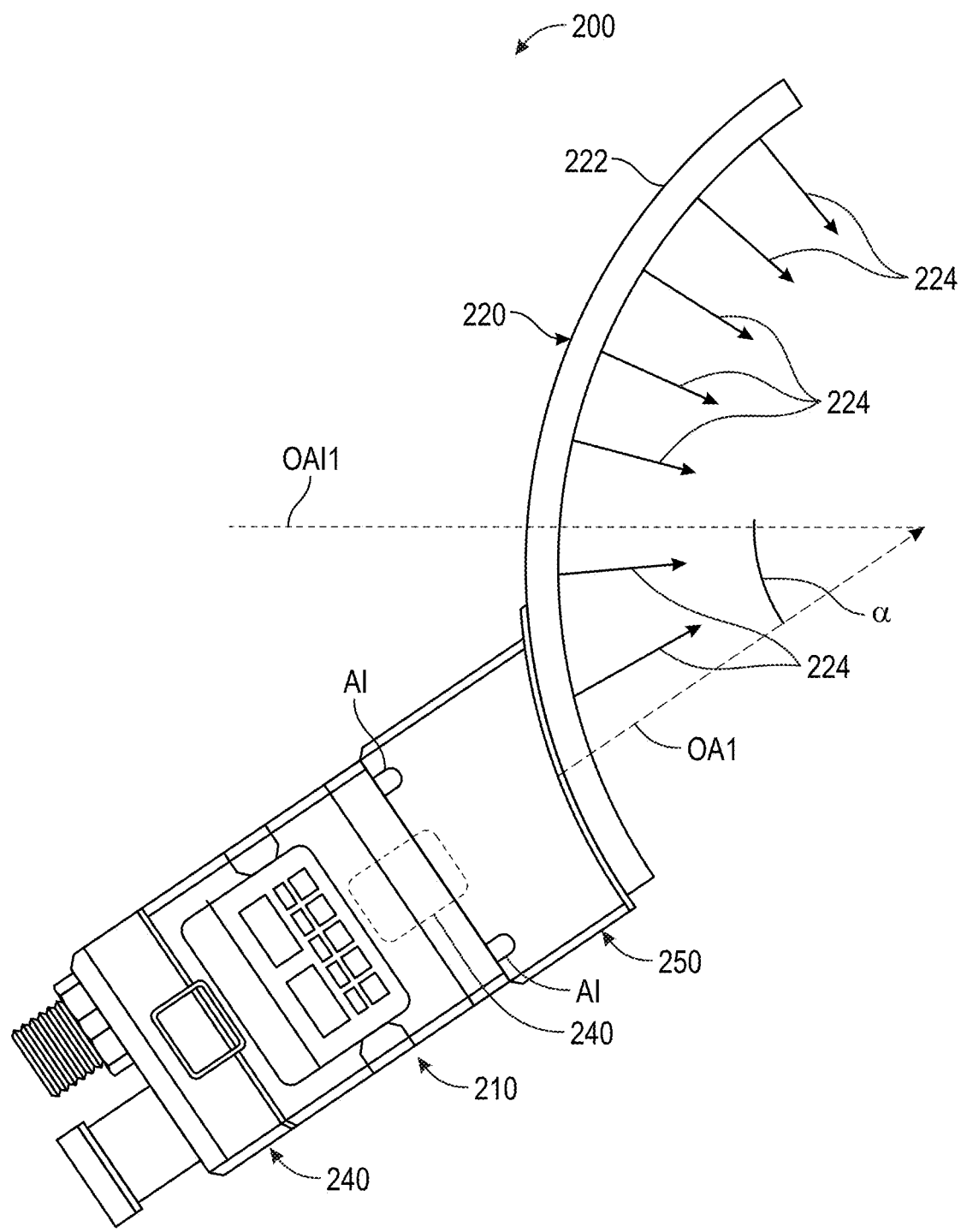
FIG. 2 is a diagram of a vision system camera assembly arranged according to the off-axis configuration of FIG. 1, including an integrated diffuser element on the front end of the camera housing.

Further reference is made to FIG. 2, which shows a vision system arrangement 200, including a camera assembly 210 for reading and decoding ID features provided in the above-described off-axis configuration. This camera assembly can include an on-board vision system processor and associated ID-decoding functional module. The camera assembly 210 also includes an attached/integrated diffusive illuminator 220. The diffuser element or emitter 222 is arranged to provide sufficient coverage on the object surface to illuminate the adjacent background, and hence the ID code features are effectively contrasted—since the projected illumination light 224 arrives at the object from a range of directions based upon the concave geometry of the diffuser element 222. That is, the refractive effect of the diffuser element material, combined with the overall geometry thereof, generates a multidirectional projection of light rays onto each point of the exposed object surface, thus ensuring that the code's features are fully illuminated regardless of the angle about the object circumference at which they occur.

The degree of outward extension and/or radius of curvature of the diffuser element/emitter 222 can vary depending, at least in part, upon the rounded shiny object's radius/curvature, and the ID code size, and these parameters define the above-described angle β that is used to design the diffuser (in which β is located around the diffuser's axis OAI1).

The camera assembly 210 as shown includes a main housing 240 and a front end 250 that surrounds the optics 230. The illumination assembly (AI above) can be directed from the front end 250 into the diffuser element 222, with the front end component 250 acting as a light pipe. The combined front end 250 and diffuser assembly 222 can be integrated into a single attachment that can be removably applied to a universal camera housing (240) with associated, integral illumination AI. It should be clear that this depicted arrangement is exemplary of a variety of assemblies that tie the diffuser element and camera housing together, and provide light to the diffuser element. As described above, in alternate embodiments, the diffuser element is electrically tied to the housing and includes its own embedded illumination source(s).

The illumination assembly can include an aimer (see the embodiment of FIG. 5 below) used in conjunction with a handheld version of the system. The aimer projects a structured light beam (e.g. a dot, cross or line) of an appropriate wavelength and/or visible color onto the object surface so as to guide the user in properly orienting the system device with respect to the object and features of interest (e.g. code). Alternatively, another form of geometrical reference or structure—for example a sighting assembly, printed indicia with instructions on proper orientation and/or a screen with feedback information as to whether the device is properly oriented—can be used to assist a user in orienting the handheld system device.

Figure 4:
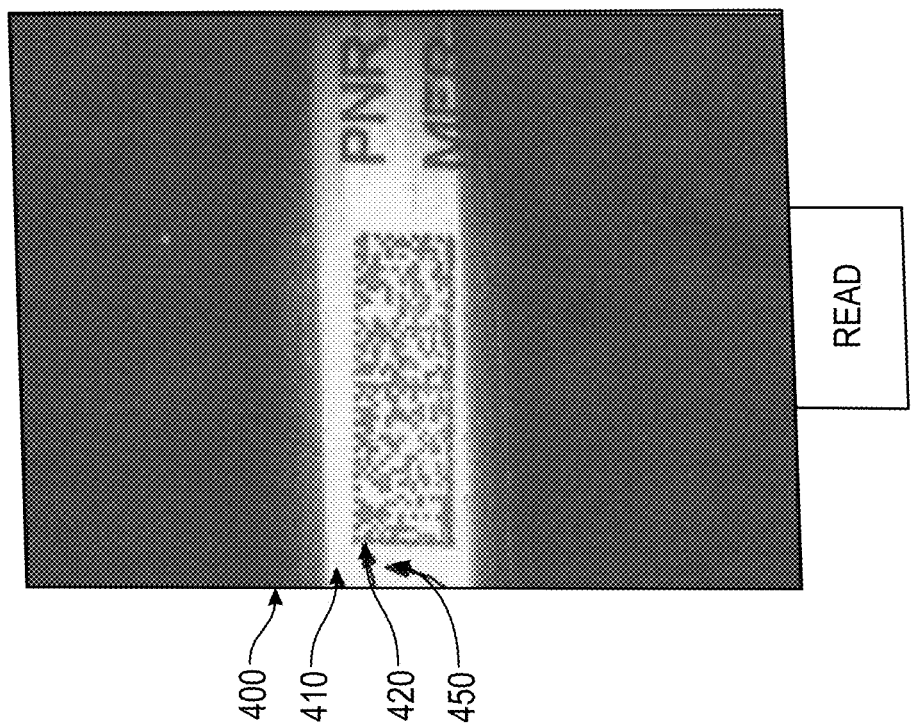
FIGS. 3 and 4 are respective diagrams of an exemplary image of a DPM code on a rounded surface using on-axis and off-axis illumination.
Figure 3:
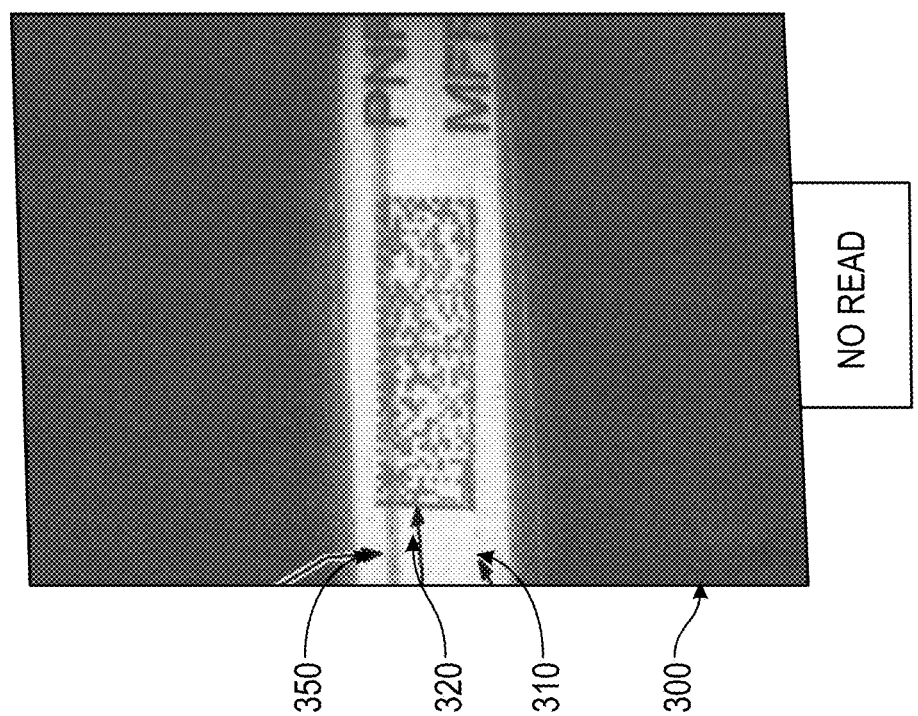

FIGS. 3 and 4 respectively depict images 300 and 400 of an exemplary (e.g. DPM) ID code 320, 420 on a rounded surface (e.g. a cylindrical shaft) 310, 410. The left image 300 is acquired using a conventional on-axis illuminator in association with a vision system camera assembly. The image of the code 320 includes a shadow line 350 that obscures details in the code 320, rendering it unreadable (per the indicator 360). Conversely, using an off-axis illumination arrangement as shown in FIGS. 1 and 2, the right image 400 contains no obscuring shadows or other occlusions in the same region 450, or elsewhere within the imaged object surface. In general, the non-zero angle defined between the overall device optical axis and the optics' optical axis in the off-axis imaging system causes any shadow or footprint of the imaging system to be located is outside of the imaged code 420. Thus, the code 420 is fully readable per the indicator 460. Hence, the off-axis configuration provides a significant advantage in reading feature sets/ID codes on rounded objects.

II. Alternate Arrangement

Figure 5:
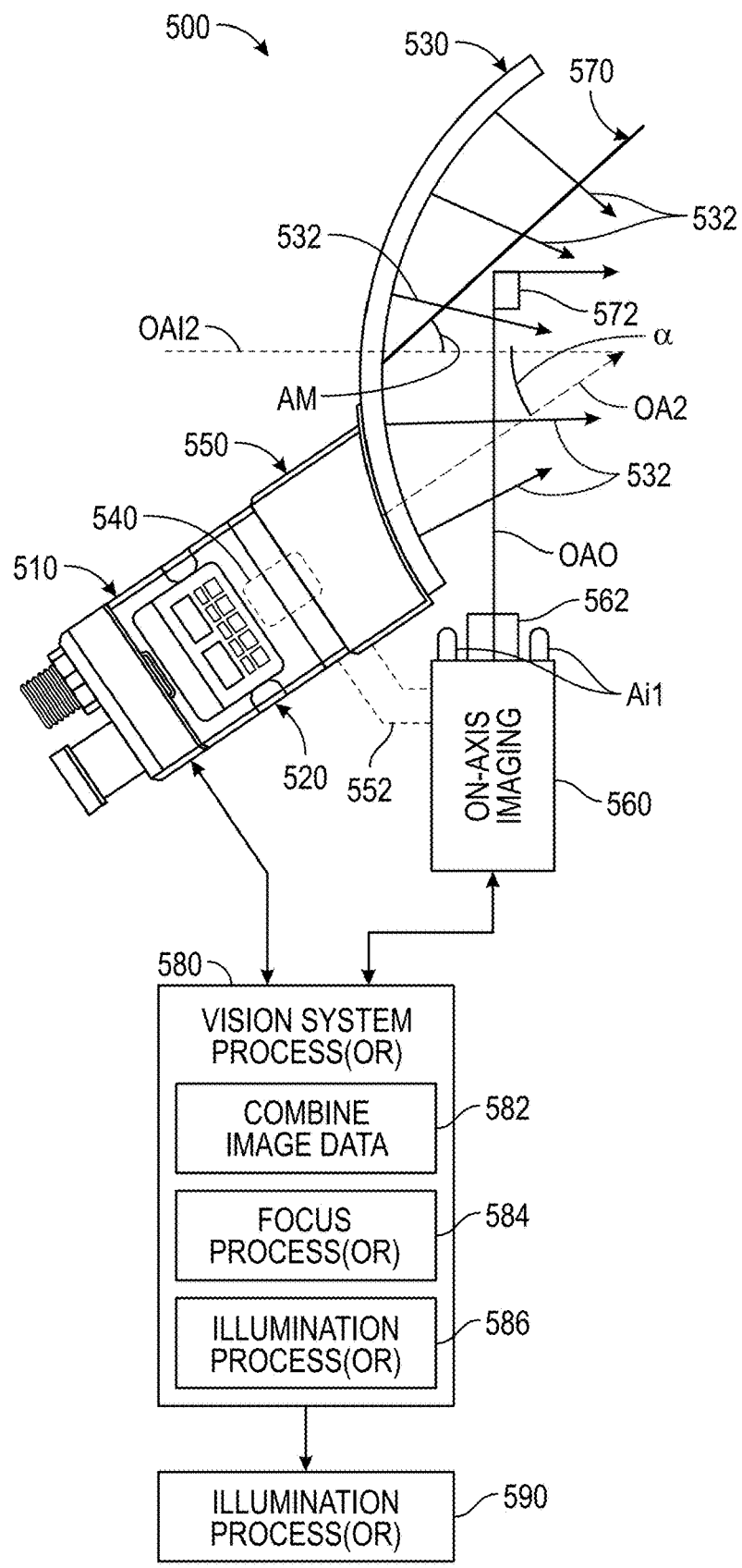
FIG. 5 is a diagram of a vision system camera assembly arranged according to an off-axis configuration, with a further on-axis imaging system that views the object through a dichroic mirror located within the optical path.

In another embodiment, the overall vision system arrangement can include an additional on-axis imaging system that is adapted to provide a second set of image data to the overall vision system, acquired with a different illumination profile. With reference to FIG. 5, a dual-image system arrangement 500 includes a camera assembly 510 with associated housing 520 that can be universal. The front end 550 can include an integrated (curved, concave, etc.) diffuser element 530 as described generally herein, which receives light from the housing 520 and transmits the light 532 in a diffuse form toward the object. The diffuser element 530 defines an axis OA12 that is arranged at a non-zero (e.g. acute) angle α with respect to the camera optics 540 optical axis OA2.

The front end 550 (or another structure associated with the housing 520) can be adapted to support the second imaging system 560 using an appropriate bracket 552 (shown in phantom), or other member. This on-axis system 560 can be combined in a compact manner with the camera housing 520 using (e.g.) a dichroic filter/mirror 570 placed in front of a portion (upper portion as shown) of the diffuser element 530. The plane of the filter/mirror 570 defines, generally, a 45-degree angle AM with respect to axis OA12. More particularly, the on-axis system 560 can include an on-axis illumination assembly (e.g. LEDs AI1), which can be implemented (e.g.) as polarized illumination using appropriate filters, etc. The light emitted by the diffusive illuminator can be cross polarized with respect to the on-axis light so that it can be distinguished from the on-axis light. The illumination is, thus, projected along the axis OAO of the optics 562 of the system 560. Illustratively, the wavelength of the on-axis illumination and the diffuse illumination are differentiated from each other by a sufficient degree to allow one of them to be discriminated and attenuated by the dichroic filter 570. The filter 570 is located above the optical axis OA2 of the off-axis camera assembly optics 540 so as to not interfere with image formation therein. The filter 570 allows passage of light 532 from the off-axis diffuser element 530, covering all, or a substantial portion thereof. However, the filter 570 is adapted to reflect on-axis illumination (AI1) light received from the object back to the on-axis optics 562. Likewise, on-axis illumination light is reflected onto the object by the filter 570 as shown (with the axis OAO bent at a 90-degree/perpendicular angle 572). Note that a dichroic filter is one of a variety of optical components that can generate a desired light-bending and aligning effect with the two light paths (for each of the imaging systems). In alternate embodiments a beam splitter can be employed, and/or a variety of other arrangements of prisms, mirrors and filters, which should be clear to those of skill.

Illustratively, both the off-axis and on-axis imaging systems/cameras 510 and 560 can include a respective focusing system, such a variable (e.g. liquid) lens, which is provided with respect to the optics 540 and 562. In an embodiment, the off axis system 510 can include a predestined working range in which features are imaged from objects, while the on-axis system can be adapted to image at an indefinite range, so that the overall reading distance of the combined arrangement 500 is extended.

Notably, the on-axis illumination AI1) can function as an aimer, in particular delimiting the field of view of the overall arrangement 500, or the aimer can also be a dedicated light source that defines the device optical axis to guide the user to properly orient the arrangement 500. It is contemplated that the arrangement 500 can be oriented properly using other mechanisms and functions, such as a sighting system, a grip assembly, etc.

The vision system processor 580—which can reside fully or partially within the arrangement's housing 520, or within a remote device (e.g. PC, laptop, tablet, handheld, etc.), is adapted to handle image data from each imaging system/camera 510 and 560. This data can be combined, or otherwise compared, using and appropriate process(or) 582.

Image acquisition of data from each imaging system 510, 562 can be sequential or concurrent. Notably, an advantage to the use of a dichroic filter is the ability to acquire images from both systems concurrently, and not sequentially. This saves time in the acquisition process. That is, the received light from the first image system's illuminator (first wavelength) only passes to the first imaging system and received light from the second imaging system's illuminator (second wavelength) only passes to the second imaging system— based upon the differentiating function of the filter. Operation of each illuminator (either sequentially or concurrently) is controlled by the illumination process(or) 586. Additionally, the focus of each imaging system's 510, 560 variable optics 550, 562 is controlled by the focus process(or) 586. Note that one or both of the optics can be fixed in alternate embodiments.

The results 590 that are provided by the arrangement 500 can be based on a successful reading of object features/IDs from either the off-axis or on-axis imaging system. The results can also be based on a combination of features from the two imaging systems, forming a composite image using techniques known to those of skill. In an embodiment, the process(or) 580 can employ a technique that first attempts to decode each image, and then if no successful result is generated from the discrete images, it combines these images and attempts to decode the composite image. Other techniques can be used to employ one or both imaging systems in alternate embodiments to achieve successful reading of features.

It should be clear that the above-described system for illuminating round object surfaces, using an off-axis curved diffuser element provides a more uniform lighting effect, and improved identification of features, such as ID codes. The system can provide enhanced range and versatility by incorporating an additional imaging system with an on-axis illuminator, which can also act as an aimer.

III. Dome Illuminator for Vision System Camera

Figure 6:
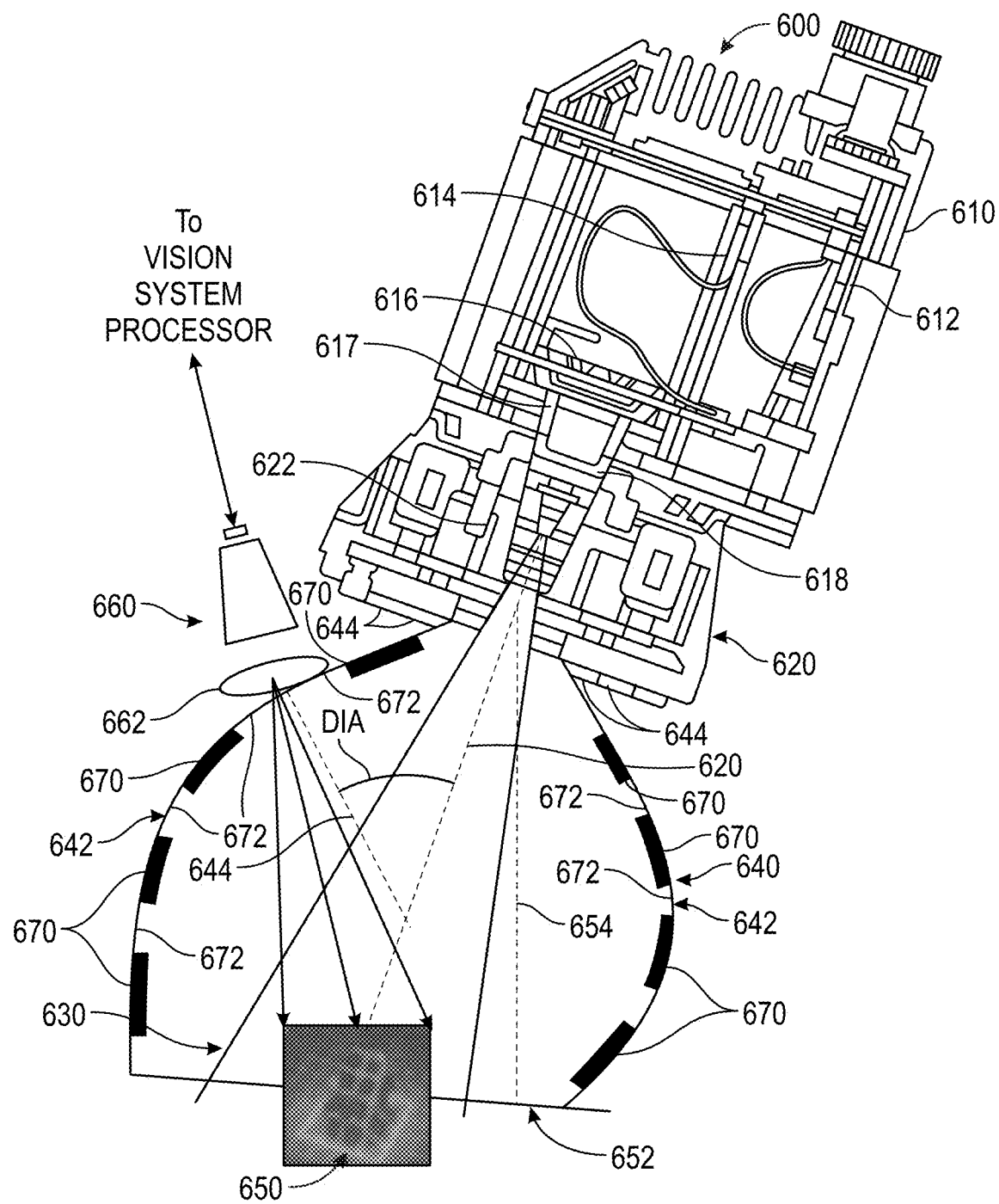
FIG. 6 is a side cross section of an exemplary vision system camera assembly with a dome illuminator assembly mounted on a front end thereof for illuminating an exemplary object.

It is contemplated that the use of structured light and other forms of advanced illumination/illuminators can allow for the use of the above-described multi-axis camera arrangement in other types of vision system applications, including inspection and robot control, in addition to ID code reading. Thus, it is contemplated that generalized dimensioning capabilities can be provided to the vision system through use of a dome illuminator assembly. With reference to FIG. 6, a vision system camera arrangement 600 is shown. The camera 600 (shown in cross section) can be based upon the above-incorporated multi-axis U.S. patent application Ser. No. 15/844,448. In general, the camera 600 can include a main housing 610 with processing boards 612 and 614, which interconnect to an image sensor circuit board 616 and associated 2D sensor 617. An optics package 618 is provided at the front end of the camera. The constituent components (lenses, filters, etc.) of the optics package 618 can vary based upon the task, and typically includes a plurality (stack) of lenses, including one or more variable (e.g. liquid) lens(es) 622 that provide adjustable focus, depth of field (DOF) etc., based upon commands of the vision system processor (including, but not limited to, processing boards 612 and 614). As described in the above-incorporated U.S. patent application, the optics 618 defines an optical axis 620 that is aligned (i.e. is on-axis) with respect to an axis perpendicular to the plane defined by the image sensor 617. The front end 620 of the camera assembly 600 includes various illumination sources, and can optionally include additional lenses and mirrors that provide a second optical path that is off-axis (i.e. not aligned with, and at an angle to the primary optical axis 620, and that transmits light from the imaged scene to a second image sensor, or to a portion of the main image sensor 617.

The camera arrangement 600 includes a dome illumination assembly (also termed a "dome illuminator") 640, which is shown mounted forward of the camera front end 620 in a manner that provides clearance for the field of view 630 of the optics 618. The dome illuminator 640 operates to generate a uniform background illumination so that features, such as ID codes, can be identified and distinguished of objects 650 having specular (reflective/shiny) surfaces. The dome illuminator 640 transmits light via a diffusing light pipe 642 that fully surrounds the object 650. The light pipe 642 can be constructed from any translucent acceptable material, such as polyethylene, acrylic or polycarbonate. The light transmitted by the pipe is generated by sources 644 residing in the front end 620 of the camera 600 in the exemplary embodiment, but can be provided by sources directly integrated, or attached to, the dome illuminator in alternate embodiments. The dome illuminator can project light in a given wavelength range—for example green, visible red, near-infrared (IR), IR or ultraviolet (UV)—so that the sensor 617 and/or filters in the optics 618 can differentiate the light of the dome illuminator from other light sources.

Note also that the dome illuminator 640, and the associated optical axis 620, is tilted with respect to the object (and/or its supporting surface 652) at an angle AD relative to the perpendicular 654. This arrangement is described further below. By way of non-limiting example, the angle AD can be approximately 15 degrees. The angle AD is highly variable—for example, plus or minus 10 degrees or more.

As depicted, a secondary light source 660 can be attached to, and/or integrated with, the dome illuminator 640 along a side thereof. The secondary light source 660 defines an axis 664 that is tilted at an angle DIA with respect to the optical axis 620. The angle DIA is highly variable—for example between 10 and 30 degrees. The secondary light source 660 is responsive to the vision system processor, or another controller, and define (e.g.) a laser diode or other narrow-bandwidth the/coherent light generator that projects light in a discrete band that can be discrete from the wavelength(s) projected through the dome illuminator 640. The secondary light source 660 can include an optics package 662 that generates a structured light pattern (e.g. crossing lines as shown on the object 650), so as to define reference features on the object surface. These reference features thereby provide a pattern on the object that can be imaged by the camera in a manner that allows the vision system processor to derive basic 2D and 3D measurements of the object surface. In this manner, the illuminator can facilitate tasks in addition to ID decoding.

Figure 7:
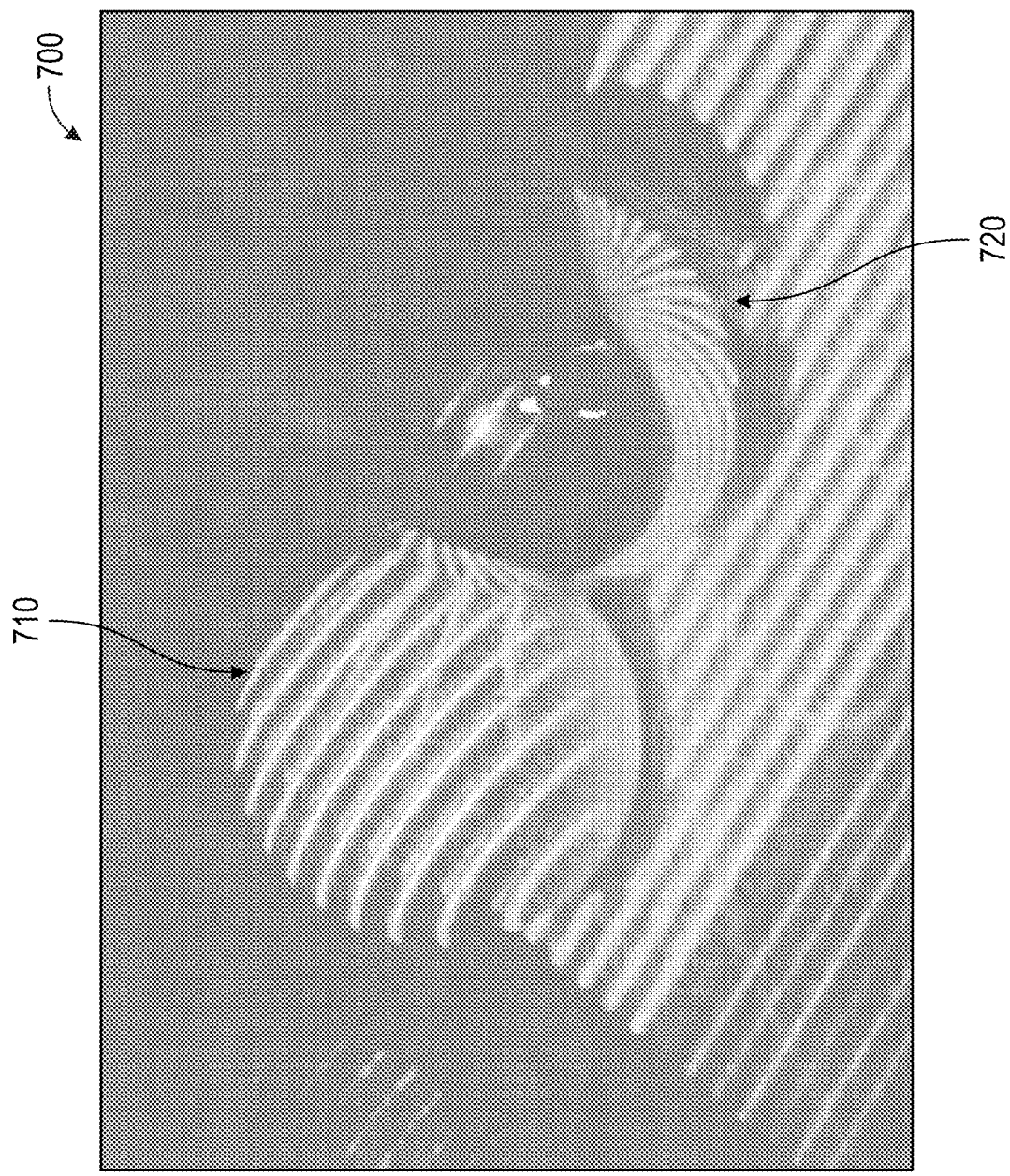
FIG. 7 is a diagram showing an image of an exemplary object having a diffuse light pattern projected by the camera assembly with dome illuminator assembly of FIG. 6.
Figure 8:
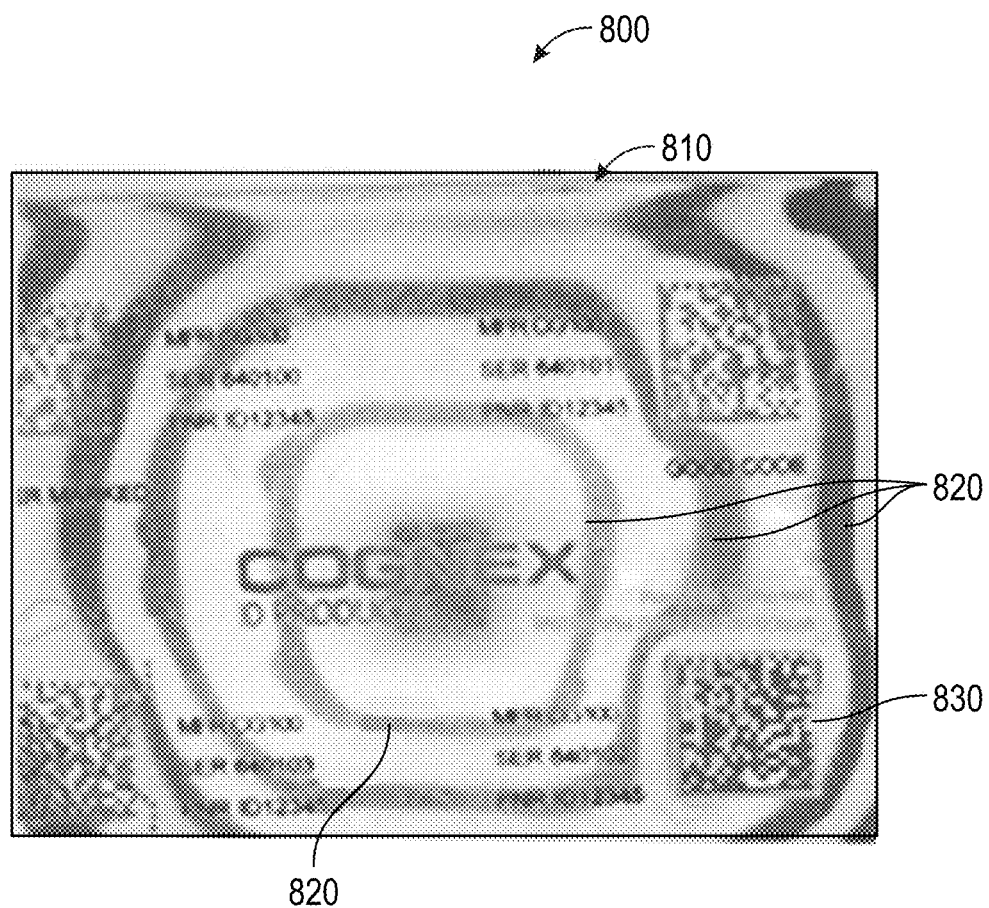
FIG. 8 is an image of an exemplary object with a shiny, or specular, relatively flat surface showing the layout of fringe patterns produced by light-filtering strips provided on the light diffusing surface of the dome illuminator of FIG. 6.
Figure 9:
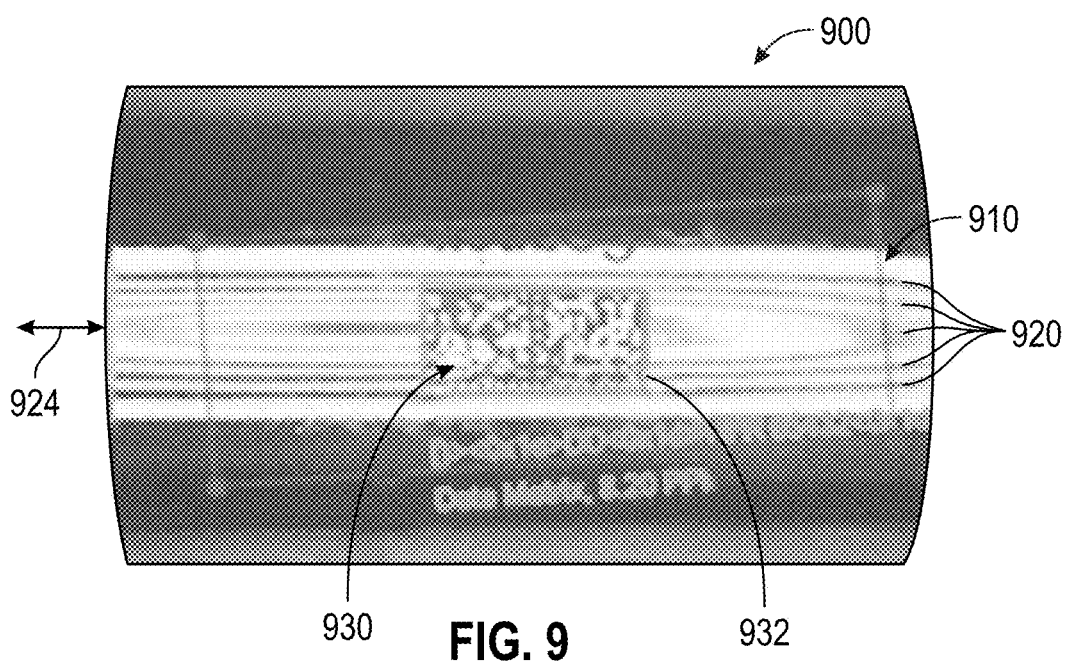
FIG. 9 is an image of an exemplary object with a shiny, or specular, cylindrical surface showing the layout of fringe patterns produced by light-filtering strips provided on the light diffusing surface of the dome illuminator of FIG. 6.

However, it is recognized that a shiny/specular surface will reflect structured illumination patterns in a manner that obscures the features sought to be measured by the vision system. This is illustrated by the image 700 of FIG. 7, in which an exemplary object 710 with a non-specular surface clearly reflects structured line features, while an exemplary object 720 with a shiny/specular surface obscures the line features in a manner that prevents identification by the vision system. The exemplary embodiment addresses this issue by providing a patterned structure that effectively obscures and/or filters part of the light projected from the diffuse surface of the dome illuminator light pipe 642. More particularly, a plurality of filtering strips 670 cover portions of the light pipe's diffuse inner surface in the manner of concentric rings. In this manner, the diffuse surface of the light pipe projects light onto the object surface through gaps 672 between strips 670. Since the dome illuminator substantially encloses the object, it effectively isolates the object from ambient light in the surrounding environment. Thus, the strips 670 produce a striped effect or pattern (termed also "fringes") on the object surface. This is shown in FIGS. 8 and 9. In particular the exemplary object image 800 in FIG. 8 includes an illuminated (potentially specular) object surface 810 that is relatively flat, and thus, the darker fringe pattern 820 appears as spread-out rings between the illuminated regions. This pattern layout thereby provides visual references to the 3D (i.e. z-axis height) topography of the object within a 2D image. One or more ID codes are depicted (code 830 being bounded by an identifying box), and thus the illumination from the dome illuminator also effectively resolves applied ID codes. In FIG. 9, the exemplary image 900 has also been illuminated by the dome illuminator with fringe pattern. The surface 910 defines a cylindrical topography that results in closely spaced, dark rings 920 along the curved dimension. These rings 920 are elongated along the axial direction (double arrow 924) of the cylinder surface 910. Hence the vision system, with trained knowledge of the geometry of the projected fringe pattern, can determine the 3D layout (often considered a 2.5D inspection of the object) of the surface 910. The illumination also highlights the features of an ID code 930 applied to the surface 910. As shown, the vision system has formed a bounding box 932 around the identified code 930.

More particularly, the known pattern formed on the inner surface of the dome illuminator's diffuse light pipe is reflected from the object surface in a manner that provides information on (e.g.) the cylinder radius, flatness of a part or even absence/presence of subparts. This is combined with the above-described structure light (e.g. laser) projection system in the secondary light source to ensure that both specular objects and those with reduced specularity can adequately reflect the associated pattern with enough optical quality to ensure that the vision system can successfully complete an object inspection (e.g. dimensioning, feature-finding, etc.) task.

In operation, the vision system processor can be adapted to operate each form of illumination in sequence and/or together so that images of the object can be acquired with specific forms of illumination. Likewise, while the strips that create the fringe pattern can be opaque (non-transmissive) of transmitted light from the diffuse light pipe surface, they can filter light of certain discrete wavelengths in alternate embodiment. For example, the strips can allow green light to pass but block red light, and the sensor can be adapted to identify particular wavelengths of light at predetermined times. Hence the term "filter" as applied to the fringe-pattern-creating structures (strips) should be taken broadly to include blocking of all transmitted light wavelengths and/or selective blocking of only some wavelengths, while allowing others to pass.

Figure 10:
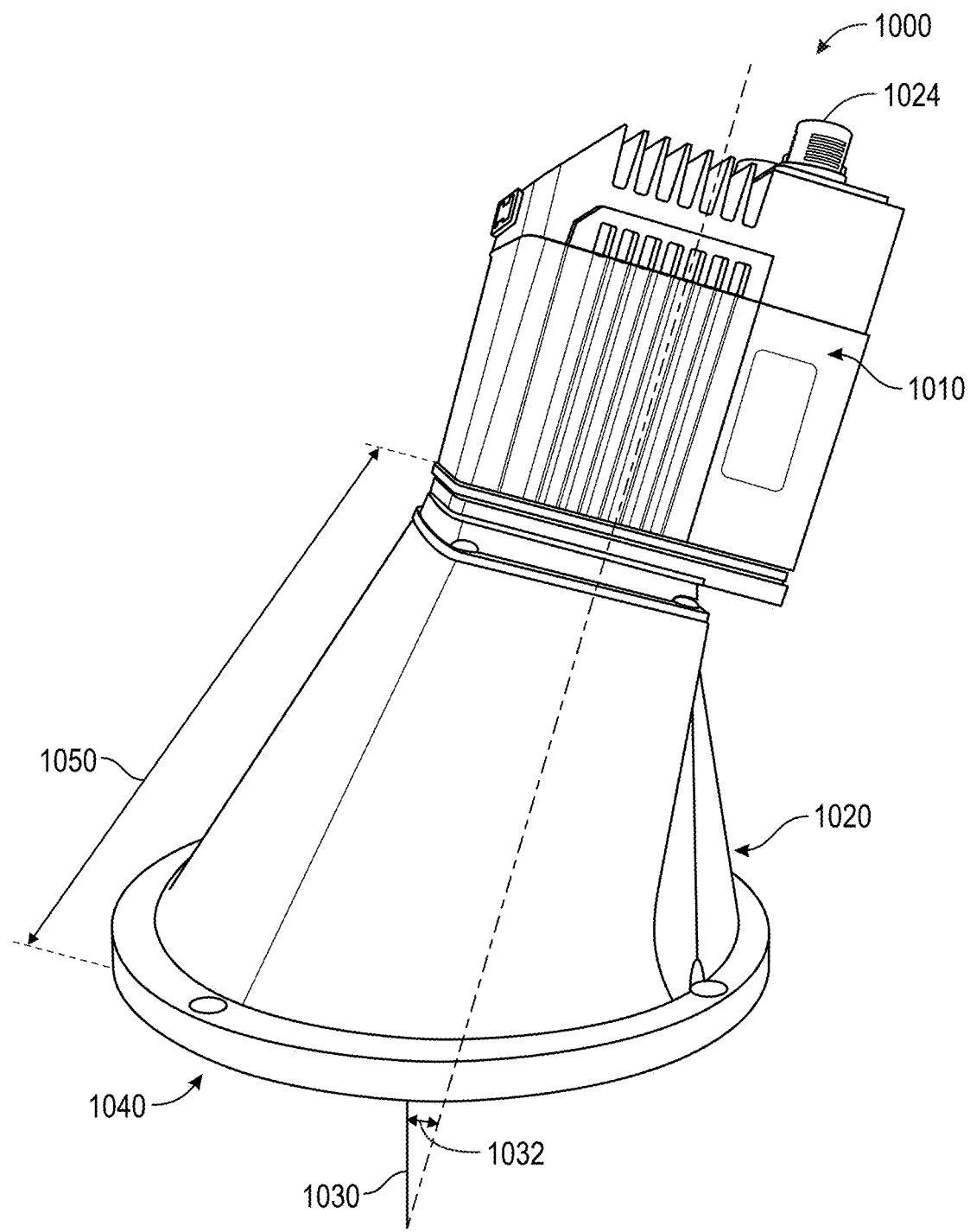
FIG. 10 is a side view of a vision system camera arrangement with a frustoconical dome illuminator having a base adapted to tilt the arrangement relative to a supporting surface, according to an exemplary embodiment.
Figure 11:
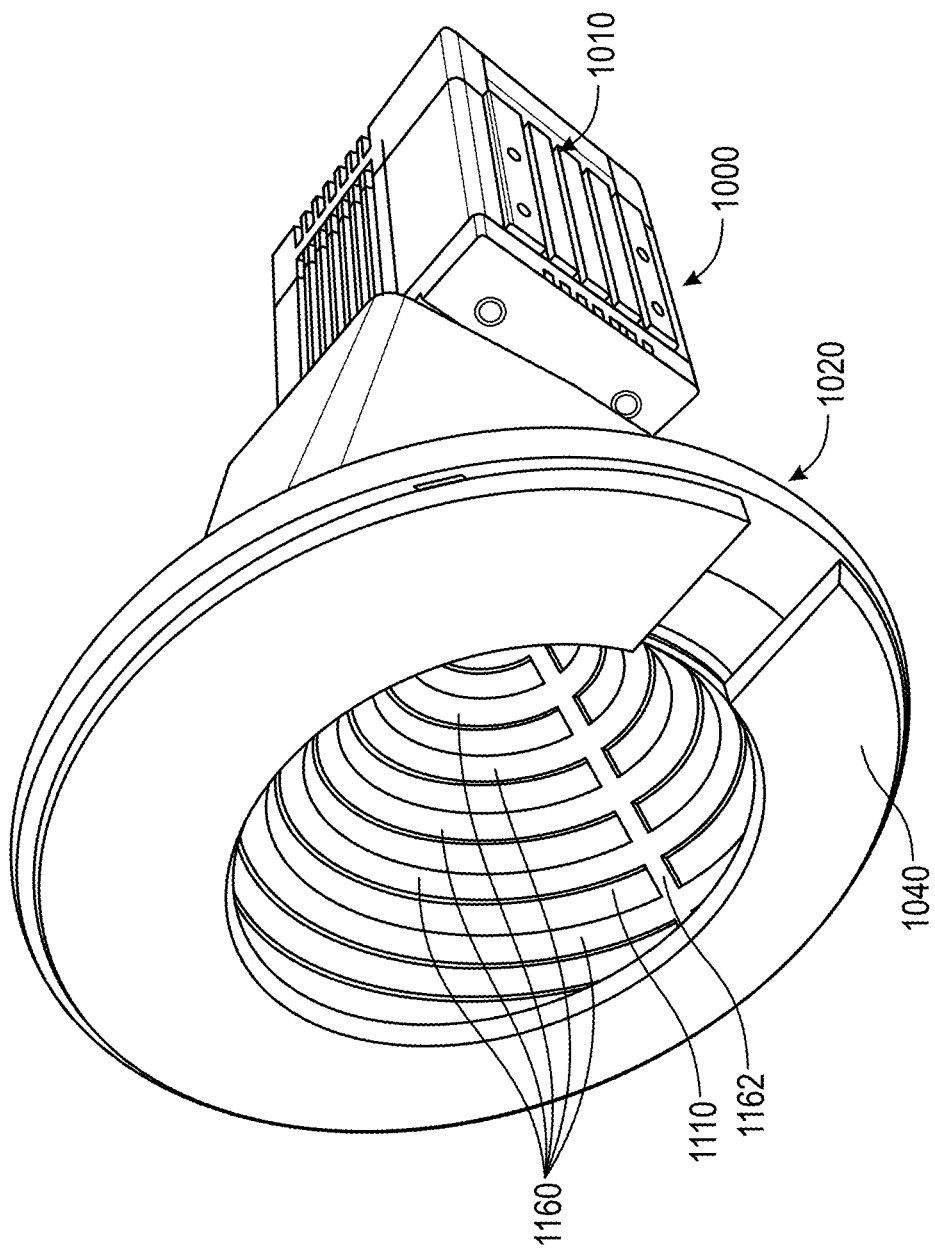
FIG. 11 is a front oriented perspective view of the vision system camera arrangement of FIG. 10 showing a set of concentric light-filtering strips in the dome illuminator that generate a fringe pattern on an object using light projected by the underlying diffuse surface.
Figure 12:
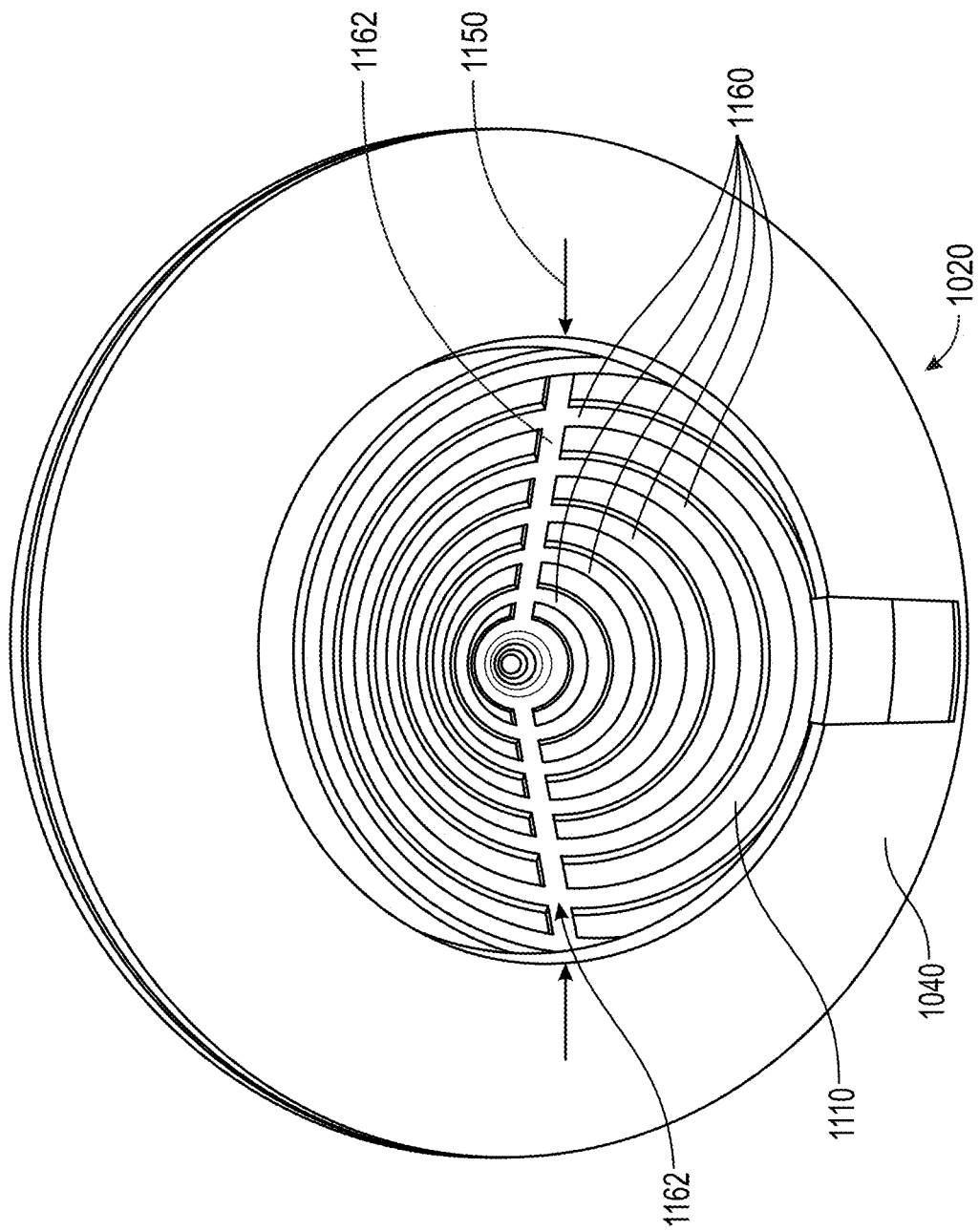
FIG. 12 is a front view of the camera arrangement of FIG. 10 detailing the layout of the concentric, light-filtering strips around the camera optics.

FIGS. 10-12 show a vision system arrangement 1000 with a camera assembly 1010 and attached done illuminator 1020, according to another exemplary embodiment. The vision system 1000 defines a longitudinal (camera optical) axis 1024 that is tilted with respect to vertical (perpendicular to the ground surface) 1030 by an angle 1032 of (e.g.) approximately 15 degrees. The base/bottom 1040 of the illuminator 1020 can be arranged to reside on a flat surface while maintaining this tilt angle. The exterior surface of the illuminator 1020 can be opaque, while the inner surface 1110 defines a diffuse light pipe (FIGS. 11 and 12). The light sources can be contained within the camera body or within the structure of the illuminator 1020.

The shape and dimensions of the illuminator 1020 can vary based upon the application and or side of objects being imaged. In an exemplary embodiment, the inside dimension of the illuminator 1020 defines a frustoconical shape with an overall length 1050 (FIG. 10) and maximum (opening) diameter 1150 (FIG. 11), which can vary both based upon the task and the steepness of the conical shape. In other embodiments, the inner surface can be a tapered curvilinear surface. The inner surface cross section (on a plane perpendicular to the axis 1024) can be circular, as shown, polygonal, or a combination of polygonal and curved shapes.

In this embodiment, with reference to FIGS. 11 and 12, the fringe pattern generating strips 1160 define a plurality of decreasing diameter concentric circles that are applied to the inner diffusive surface 1110 of the light pipe. The strips can be constructed from any acceptable transmissive or translucent material to produce a filtering effect, as described above. In various embodiments, the strips can be molded unitarily with the material of the light pipe, integral or applied as a separate structure. In this embodiment, the strips are an assembly with a pair of opposing spacer ribs 1162. The width of the concentric strips 1160 are highly variable. The strips 1160 are sized and arranged within the interior of the dome illuminator 1020 to produce an appropriate pattern on the object, which allows the vision system to determine relative contours from an acquired image. While not shown, an off-axis, secondary illuminator can be mounted on or within the housing of the dome illuminator 1020 and project an appropriate structured light pattern on the imaged object at a predetermined time.

Figure 13:
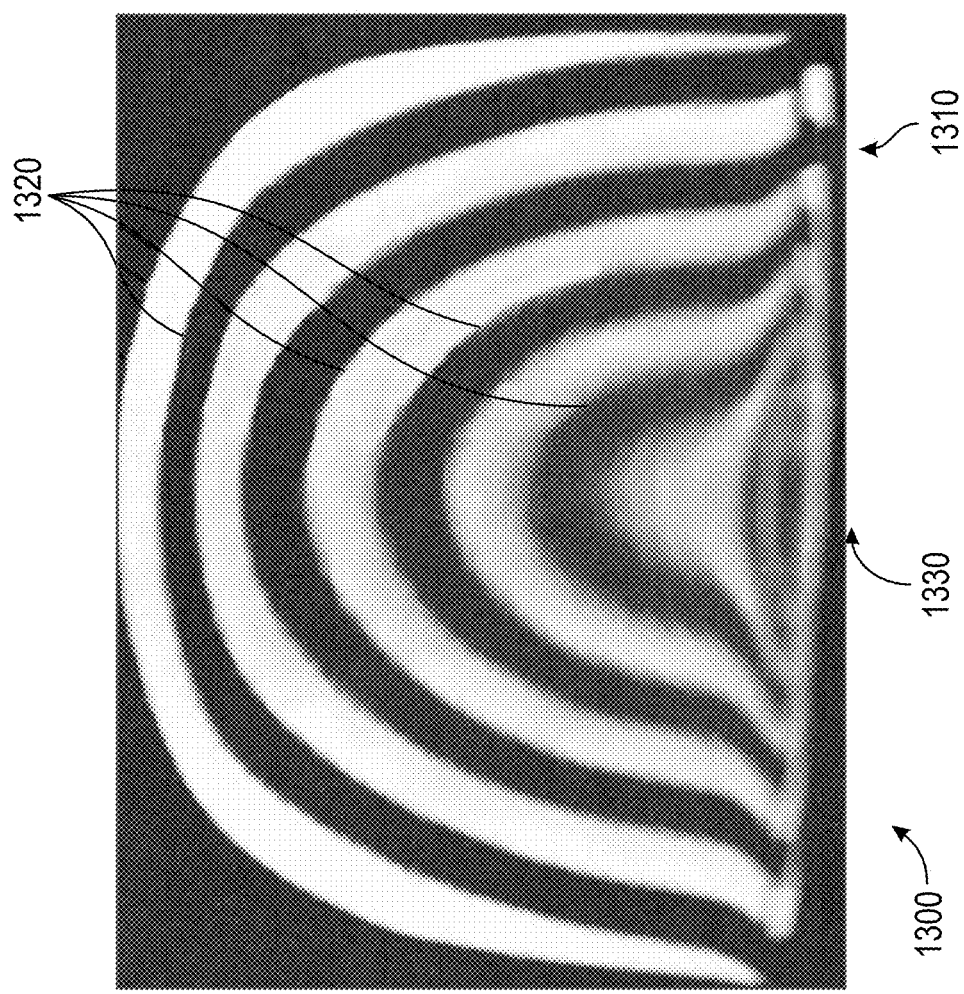
FIG. 13 is an image of an exemplary object having a shiny, or specular, relatively flat surface showing the layout of fringe patterns generated by the light-filtering concentric strips in the dome illuminator of FIG. 10.
Figure 14:
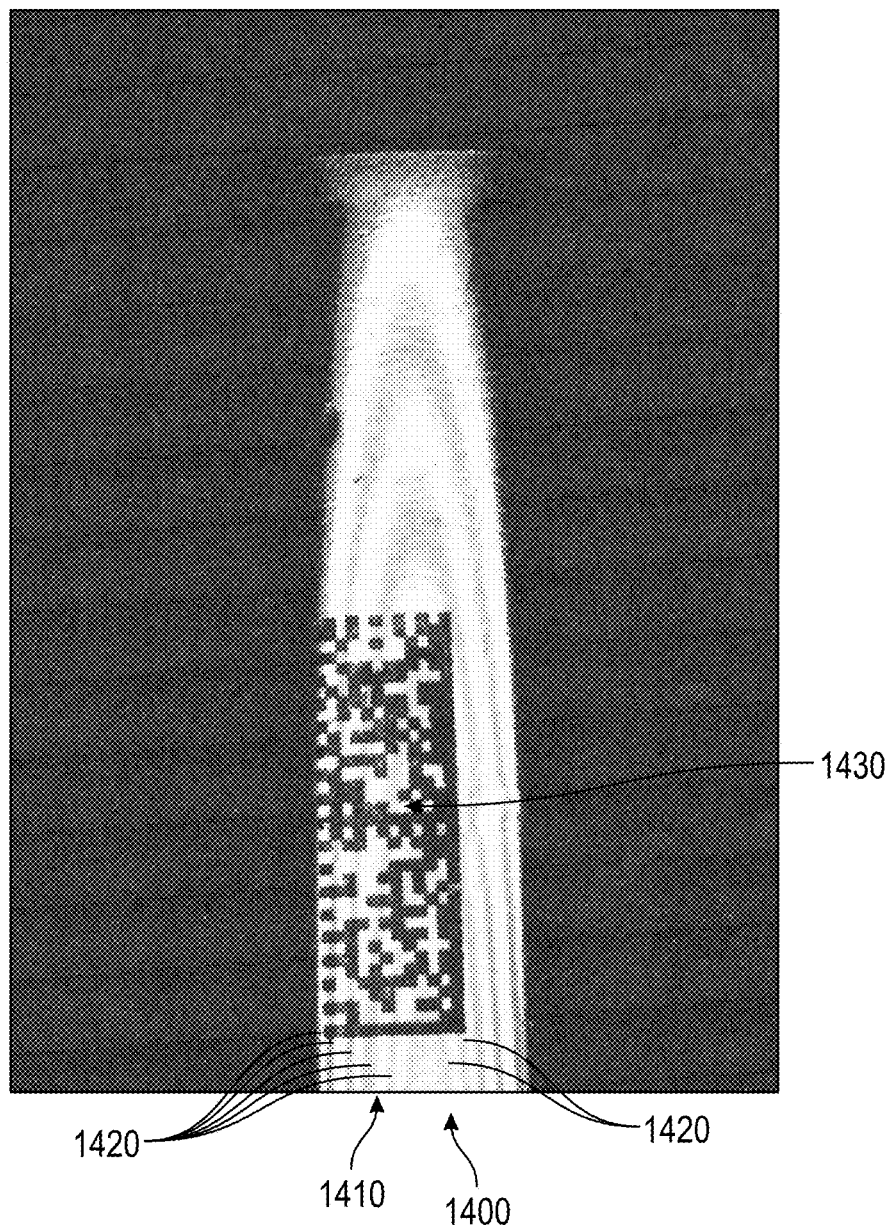
FIG. 14 is an image of an exemplary object having a shiny, or specular, cylindrical surface showing the layout of fringe patterns generated by the light-filtering concentric strips in the dome illuminator of FIG. 10.

FIGS. 13 and 14 depict respective images 1300 and 1400 of exemplary specular objects with the camera assembly 1010 and dome illuminator 1020. The image 1300 in FIG. 13 depicts a relatively planar object 1310—evidenced by a semicircle of dark fringes 1320. The edge 1330 of the object 1310 defines a sharp drop-off where the fringes terminate. Alternatively, the image 1400 of FIG. 14 shows a set of closely spaced, elongated fringes, indicative of a cylindrical object surface. An ID code 1430 is clearly resolved in the image using the illuminator 1120.

IV. Conclusion

It should be clear that the camera and illumination assemblies described herein allow for accurate imaging of a variety of object shapes and surfaces. The arrangements effectively resolve ID codes and other features and allow for additional tasks, such as dimensioning to be performed by an associated vision system process(or).

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein, various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances (e.g. 1-2%) of the system. Note also, as used herein the terms "process" and/or "processor" should be taken broadly to include a variety of electronic hardware and/or software based functions and components. Moreover, a depicted process or processor can be combined with other processes and/or processors or divided into various subprocesses or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Accordingly, this description is meant to be taken only by way of example, and not to otherwise limit the scope of this invention.

What is claimed is:

1. An illumination system for a vision system camera, that provides image data to a vision system processor, defining a first optical axis and a field of view (FOV) surrounding the first optical axis comprising:
   a dome illuminator having a predetermined length and that substantially envelopes the FOV, the dome illuminator defining an inside emitter surface that is substantially diffuse along at least a portion thereof and approximately defining a central axis that is non-parallel with respect to the first optical axis, wherein the dome illuminator generates a substantially uniform light distribution on an object in the FOV;
   a pattern of light-filtering elements that selectively filter light emitted from the inside emitter surface, located along the central axis, wherein the vision system camera is arranged to capture an image in the FOV of the pattern of light filtering elements reflected by an object having a surface that is shiny; and
   the vision system processor being arranged to determine a shape of the surface of the object based upon the image.

2. The illumination system as set forth in claim 1 wherein the pattern of light-filtering elements define a plurality of stripes that reside at spaced-apart locations in a direction along the central axis of the inside emitter surface.

3. The illumination system as set forth in claim 2 wherein the pattern of light-filtering elements are arranged to define a plurality of approximately concentric rings about the central axis within the FOV.

4. The illumination system as set forth in claim 3, wherein the vision system processor analyzes a geometric arrangement of the concentric rings in the image of the object to determine a relative shape of the object.

5. The illumination system as set forth in claim 4 wherein the image includes ID code features and the vision system processor is arranged to find and decode ID codes in the image.

6. The illumination system as set forth in claim 1, further comprising, a structured light accessory that projects structured light so as to define a structured light pattern on an object and the vision system processor is arranged to determine a surface shape of the object based upon the structured light pattern.

7. The illumination assembly as set forth in claim 6 wherein the vision system processor is arranged to analyze an object having a non-specular or matte surface based upon an arrangement of the structured light pattern on the non-specular or matte surface and to analyze the object having the shiny surface based upon a diffuse light emitted from the emitter surface.

8. The illumination system as set forth in claim 1, further comprising, light sources in optical communication with the dome illuminator adapted to project a plurality of discrete visible wavelength ranges through the inside emitter surface.

9. The illumination system as set forth in claim 8 wherein the light-filtering elements are adapted to transmit at least one of the plurality of discrete visible wavelength ranges projected by the light sources and to filter out another of the plurality of discrete visible wavelength ranges projected by the light sources.

10. The illumination system as set forth in claim 9 wherein the at least one of the plurality of discrete visible wavelength ranges projected by the light sources and the other of the plurality of discrete visible wavelength ranges projected by the light sources are complementary colors with respect to each other.

11. The illumination system as set forth in claim 1 wherein the vision system camera further comprises a first imaging system having a first image sensor and first optics defining a first optical axis with respect to the FOV, and wherein the first imaging system is contained in a housing defining a device optical axis.

12. The illumination system as set forth in claim 11 wherein the device optical axis is defined with respect to an aimer beam or a mechanical geometric reference on the housing.

13. The illumination system as set forth the in claim 12, further comprising a vision system housing adapted for handheld use, and at least one of (a) an aimer illumination source and (b) a mechanical geometric reference that assists a user in orienting the housing with respect to features of interest on an object.

14. The illumination system as set forth in claim 11 wherein the vison system camera further comprises a second imaging system having a second image sensor and a second optics having a second optical axis, the second optical axis being on-axis with the device optical axis adjacent to the FOV.

15. The illumination system as set forth in claim 14 wherein the second optical axis is brought together, on-axis, with the device optical axis by an optical component that bends light from a first path to a second path.

16. The illumination system as set forth in claim 14 wherein the first optics or the second optics includes an adjustable-focus variable lens.

17. A vision system for imaging an object comprising:
(a) a first imaging system having a first image sensor and first optics defining a first optical axis with respect to the object;
(b) a vision system processor receiving image data from the first imaging system;
(c) a dome illuminator having a predetermined length and that substantially envelopes the FOV, the dome illuminator defining an inside emitter surface that is substantially diffuse along at least a portion thereof and approximately defining a central axis that is non-parallel with respect to the first optical axis, wherein the dome illuminator generates a substantially uniform light distribution on an object in the FOV;
(d) a pattern of light-filtering elements that selectively filter light emitted from the inside emitter surface, located along the central axis, wherein the vision system camera is arranged to capture an image in the FOV of the pattern of light filtering elements reflected by the object where a surface thereof is shiny; and
(e) the vision system processor being arranged to determine a shape of the surface of the object based upon the image.

18. The vision system as set forth in claim 17, further comprising, a structured light accessory that projects structured light so as to define a structured light pattern on an object and the vision system processor is arranged to determine a surface shape of the object based upon the structured light pattern.

19. The vision system as set forth in claim 18, further comprising, a second imaging system having a second image sensor and a second optics having a second optical axis, the second optical axis being on-axis with a device optical axis adjacent to the object.

* * * * *